United States Patent [19]
Heren et al.

[11] Patent Number: 5,201,570
[45] Date of Patent: Apr. 13, 1993

[54] VEHICLE EQUIPPED WITH AN ANTI-SKID SYSTEM

[75] Inventors: Jean A. Heren, Compiegne; Jacques P. Fontaine, Verberie; Pierre Fillion, Pontpoint, all of France

[73] Assignee: Societe Anonyme: Poclain Hydraulics, France

[21] Appl. No.: 845,176

[22] Filed: Mar. 3, 1992

[30] Foreign Application Priority Data

Mar. 19, 1991 [FR] France ............... 91 03347

[51] Int. Cl.$^5$ ............................................. B60K 28/16
[52] U.S. Cl. ..................................... 303/10; 303/113.2; 303/116.1; 180/197
[58] Field of Search ............... 303/113.2, 116.3, 116.1, 303/10, 11, 13; 180/197

[56] References Cited

U.S. PATENT DOCUMENTS

| | | | |
|---|---|---|---|
| 3,595,334 | 7/1971 | Issac | 180/197 |
| 3,608,984 | 9/1971 | Skoyles | 303/10 X |
| 3,893,535 | 7/1975 | Burckhardt et al. | 180/197 |
| 4,236,595 | 12/1980 | Beck et al. | 180/197 X |
| 4,399,886 | 8/1983 | Pollman | 180/197 |
| 4,785,903 | 11/1988 | Leiber et al. | 180/197 |
| 4,995,470 | 2/1991 | Yamaguchi et al. | 180/197 |
| 5,130,928 | 7/1992 | Petersen | 180/197 X |
| 5,136,509 | 8/1992 | van Zanten et al. | 180/197 X |

FOREIGN PATENT DOCUMENTS

| | | |
|---|---|---|
| 0224144 | 6/1987 | European Pat. Off. . |
| 0226844 | 7/1987 | European Pat. Off. . |
| 3644138 | 7/1988 | Fed. Rep. of Germany . |
| 2651729 | 3/1991 | France . |
| 2221516 | 2/1990 | United Kingdom . |

Primary Examiner—Matthew C. Graham
Assistant Examiner—Peter M. Poon
Attorney, Agent, or Firm—Ladas & Parry

[57] ABSTRACT

The present invention relates to a vehicle equipped with wheels coupled to fluid motors, restrictions being placed on supply or exhaust conduits of the motors. According to the invention, the vehicle comprises front and rear wheels, each coupled to one of the motors, each motor being of a reversible type, while a restriction is placed on the supply conduit of each motor coupled to the rear wheels, another restriction being placed on the exhaust conduit of each motor coupled to the front wheels. One application of the invention is the production of a wheeled vehicle equipped with a simple and efficient anti-skid system for its wheels.

2 Claims, 3 Drawing Sheets fig_1

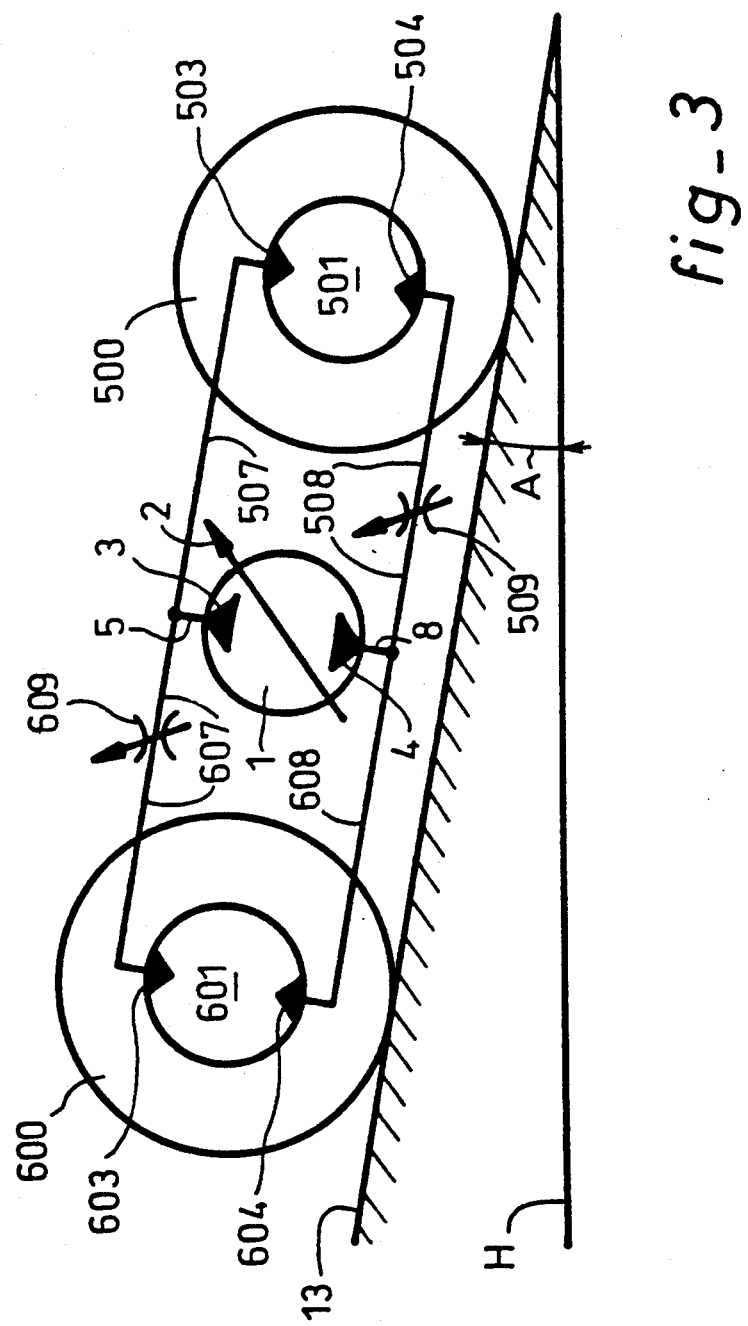
fig_3

VEHICLE EQUIPPED WITH AN ANTI-SKID SYSTEM

FIELD OF THE INVENTION

The present invention relates to a vehicle equipped with an anti-skid system.

BACKGROUND OF THE INVENTION

Patent FR-A-2 651 729 discloses a vehicle equipped with a plurality of displacement members, at least certain of which being coupled to a fluid motor and comprising a pressurized fluid supply circuit comprising, in addition to said motors: a source of pressurized fluid connected to a fluid delivery conduit; at least two fluid supply conduits each connected, on the one hand, in parallel, to said fluid delivery conduit, on the other hand, to a particular one of said fluid motors, the latter each comprising a fluid exhaust conduit; and devices for measuring the speed of at least those of the displacement members coupled to said particular motors; as well as the following characteristic features: a) restrictions of adjustable values are disposed on at least one of the fluid supply and fluid exhaust conduits of said particular motors, one on each fluid supply and/or fluid exhaust conduit, and are provided with individual devices for adjusting their values; b) a reference speed of displacement members is selected; c) a processing device, incorporated in the vehicle, compares each measured speed of said displacement members coupled to the particular motors, with said reference speed and generates, for each particular motor, a correction signal, the processing device comprising as many output connections, where the correction signals are available, as there are restrictions, each correction signal corresponding to the measured speed of a displacement member coupled to one of said particular motors; d) each outlet connection is connected to the device for adjusting the value of the restriction placed on the fluid supply conduit or on the fluid exhaust conduit of the particular motor corresponding to the correction signal generated by the processing device from the measured speed of the displacement member coupled to said particular motor.

It is commonplace for a vehicle to move over sloping ground. When descending a slope, the vehicle as defined hereinbefore risks racing of the motors coupled to one of its groups of displacement members, front or rear.

It is an essential object of the invention to eliminate this risk of racing and thus to allow the vehicle equipped with such motors to move in complete safety whatever the terrain, including going down a slope in forward gear and in reverse.

SUMMARY OF THE INVENTION

To that end, according to the invention, when the vehicle comprises front and rear displacement members, each coupled to one of said particular motors, each particular motor being of a reversible type, a restriction of adjustable value is placed on the supply conduit of each particular motor coupled to the rear displacement members, another restriction of adjustable value likewise being placed on the exhaust conduit of each motor coupled to the front displacement members.

According to a preferred embodiment, said reference speed is equal to the lowest of the measured speeds of the displacement members of the vehicle.

The principal advantage of the invention resides in obtaining both the elimination of the skid of the displacement members of a vehicle and the elimination of all risks of racing of the motors driving the vehicle. The simplicity of the constitution of the invention should be noted, satisfactory functioning being, of course, obtained, the fluid motors being able in particular to have constant cubic capacities, or present a plurality of cubic capacities not continuously variable, and that each pump not necessarily presenting continuously variable cubic capacities either, the constituents of the invention therefore being simple and inexpensive.

BRIEF DESCRIPTION OF THE DRAWINGS

The invention will be more readily understood on reading the following description with reference to the accompanying drawings, in which:

FIG. 3 completes the diagram of FIG. 1 of the supply circuit of the hydraulic motors of the vehicle.

DETAILED DESCRIPTION OF THE DRAWINGS

Figure 1:
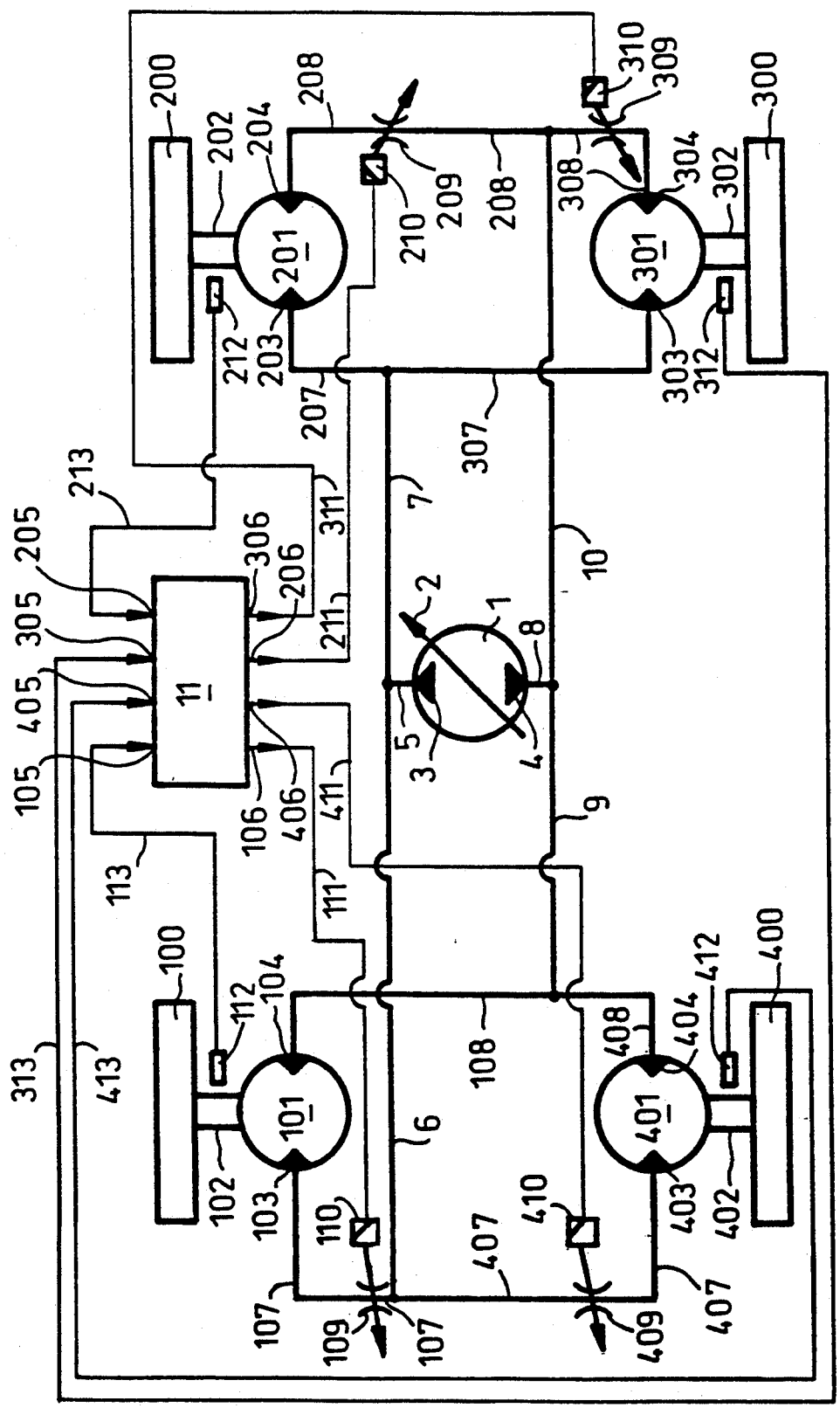
FIG. 1 is the diagram of the hydraulic supply circuit of the hydraulic motors coupled to the driving wheels of a wheeled vehicle according to the invention.

Referring now to the drawings, FIG. 1 shows the four driving wheels (or wheel assemblies) 100, 200, 300, 400 of a vehicle and the pressurized fluid supply circuit of the reversible hydraulic motors 101, 201, 301, 401 coupled (102, 202, 302, 402) to said wheels, respectively. Wheels 100 and 400 are rear wheels, wheels 200 and 300 being front wheels.

This fluid supply circuit comprises:

said hydraulic motors 101, 201, 301, 401, which are of a reversible type;

two principal connections per motor 103, 104; 203, 204; 303, 304; 403, 404, constituting at a given moment one of the principal connections 103, 203, 303, 403, the connection for fluid supply of the motor, and the other principal connection 104, 204, 304, 404, the connection for exhaust of the fluid from the motor, and vice versa;

a pump 1, with continuously variable cubic capacity, with inclinable plate 2, presenting two principal connections 3, 4, one, 3, of these principal connections constituting at a given moment the connection for delivery of pressurized fluid, connected to a delivery conduit 5, to which are connected in parallel two connecting conduits 6, 7, the other principal connection 4 constituting the connection for suction of the pump, connected to a suction conduit 8, to which are connected in parallel two other connecting conduits 9, 10, the principal connections 3, 4 each constituting the delivery connection or the suction connection, and vice versa;

a processing device 11, which comprises four input connections 105, 205, 305, 405 and four output connections 106, 206, 306, 406;

conduits 107, 407 connecting the principal connections 103, 403 of motors 101, 401 to the connecting conduit 6;

conduits 207, 307 connecting the principal connections 203, 303 of motors 201, 301 to the connecting conduit 7;

conduits 108, 408 connecting the principal connections 104, 404 of motors 101, 401 to the connecting conduit 9;

conduits 208, 308 connecting the principal connections 204, 304 of motors 201, 301 to the connecting conduit 10;

restrictions 209 and 309, provided with devices 210, 310 for adjusting their values and disposed on the conduits 208, 308, respectively, which constitute the exhaust conduits of motors 201, 301 of the front wheels, when the connection 3 constitutes the delivery connection of pump 1;

restrictions 109 and 409, provided with devices 110, 410 for adjusting their values and disposed on conduits 107, 407 respectively, which constitute the supply conduits of motors 101, 401 of the rear wheels, when the connection 3 constitutes the delivery connection of pump 1;

electric wires 111, 211, 311, 411, which join the output connections 106, 206, 306, 406 to the adjusting devices 110, 210, 310, 410, respectively;

devices 112, 212, 312, 412 for measuring the speed of wheels 100, 200, 300, 400, disposed near said wheels, respectively;

electric wires 113, 213, 313, 413, which join the speed measuring devices 112, 212, 312, 412 to the input connections 105, 205, 305, 405 of the processing device 11, respectively.

Figure 2:
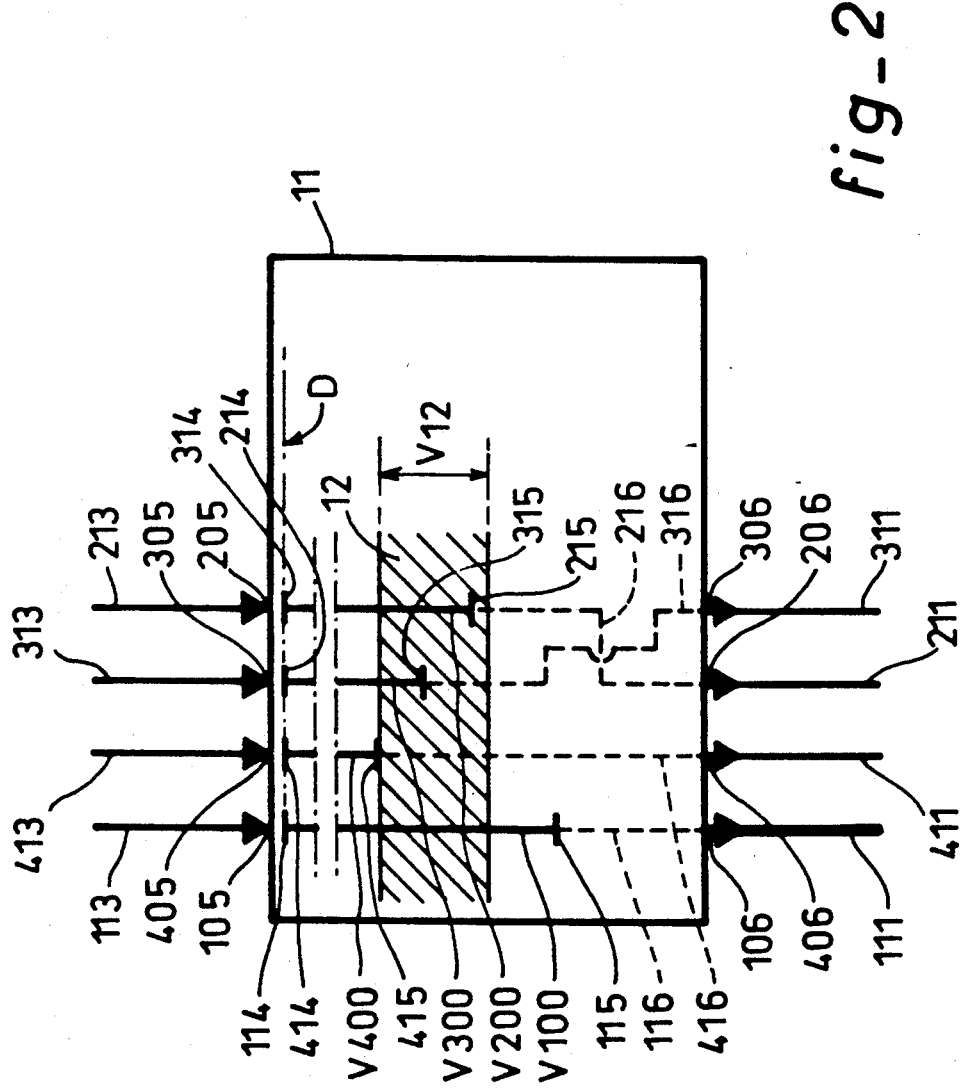
FIG. 2 is a schematic section through a constituent of the circuit of FIG. 1.

The magnitudes (current intensity) V100, V200, V300, V400 measuring, by means of the speed measuring devices 112, 212, 312, 412, the speeds of wheels 100, 200, 300, 400, may be illustrated, in the diagram of FIG. 2, by parallel segments of straight line V100, V200, V300, V400, proportional to these magnitudes, and having a first end 114, 214, 314, 414 placed on the same original straight line D. In the example shown, V400 is the smallest of these magnitudes. Device 11 defines, from said smallest magnitude (V400), a neutralization range 12 of magnitude V12. The second ends 215, 315 of segments V200, V300 are contained within range 12, or end 115 of segment V100 exceeds said range, the second end 415 of segment V400 being on the upstream edge of range 12. The processing device 11 therefore selects a reference magnitude V400, here the smallest of the magnitudes measured, and compares with this magnitude each of the other magnitudes V100, V200, V300, but neutralizing range 12. To each end 115, 215, 315, 415, the processing device causes to correspond (116, 216, 316, 416) an output signal which is available at the output connections 106, 206, 306, 406.

For those, V200, V300, of these magnitudes which do not exceed V400 by more than the value V12 of the neutralization range 12, the processing device 11 transmits a zero signal to the corresponding output connections 206, 306.

For that, V100, of these magnitudes which is greater than the sum (V400+V12) of the reference magnitude V400 and of the magnitude V12 of the range 12, the processing device 11 transmits to the corresponding output connection (106) an output signal proportional to the difference (V100−V400) between the magnitude V100 in the course of processing and the reference magnitude V400.

This output signal (or signals) is conveyed by wire 111 up to the device 110 for adjusting the value of the restriction 109. Said restriction 109 creates a head loss which reduces the pressure of the fluid between the upstream and downstream of the restriction.

When conduit 5 contains the fluid delivered by pump 1, conduits 108, 208, 308, 408 constitute exhaust conduits of hydraulic motors 101, 201, 301, 401. In that case, the restrictions 209, 309 are placed on the exhaust conduits 208, 308 and produce counterpressures adapted to the values of the speeds measured by the devices 212, 312, opposing the exhaust of the fluid from each motor, therefore capable of provoking a deceleration of each motor 201, 301, as well as of the wheel which is coupled thereto, said deceleration being a function of the measured excess of the speed of said wheel with respect to the reference speed. Similarly, restrictions 109, 409 produce adjustable throttles having values adapted to the values of the speeds measured by the devices 112, 412 capable of opposing admission of the pressurized fluid supplying the motors 101, 401, therefore capable of provoking deceleration of each motor 101, 401, as well as of the wheel which is coupled thereto, deceleration being a function of the measured excess of the speed of said wheel with respect to the reference speed.

When conduit 8 contains the fluid delivered by pump 1, conduits 108, 208, 308, 408 constitute the supply conduits of the hydraulic motors 101, 201, 301, 401. In that case, the restrictions 209, 309 cause a head loss, which reduces the pressure prevailing in the principal connections 204, 304 of said motors 201, 301, therefore reduce the driving torque of these motors. Complementarily, the restrictions 109, 409, by opposing the exhaust of the fluid from motors 101, 401, also provoke a possible deceleration thereof, these various decelerations of the motors 101, 201, 301, 401 being adjusted by the adjusting devices 110, 210, 310, 410, themselves controlled by the processing device 11 from the values of the speeds measured by the measuring devices 112, 212, 312, 412.

Whether the pressurized fluid for supply of the hydraulic motors be contained in conduit 5 or contained in conduit 8, the final effect is the same in both cases.

FIG. 3 reproduces the same diagram, simplifying it to facilitate understanding of the functioning, it being understood that speed measuring devices similar to devices 112, 212, 312, 412, a processing device similar to device 11, and adjusting devices similar to devices 110, 210, 310, 410, are provided, although not shown, and, concerning the devices for measuring the speeds of rotation of the wheels, are associated with the front (500) and rear (600) wheels and, concerning the devices for adjusting the values of the restrictions, are associated with the restrictions 509 and 609, respectively.

The diagram of FIG. 3 therefore shows the front wheels 500 and rear wheels 600 of the vehicle placed on ground 13 inclined by an angle A with respect to the horizontal direction H, the front wheels 500 being placed at a level lower than that of the rear wheels 600, the vehicle descending the slope in forward gear.

In this diagram, a pump 1 with continuously variable cubic capacity, and with inclinable plate 2, presents two connections 3, 4 to which are connected conduits 5 and 8. Here, it is assumed that conduit 5 constitutes the delivery conduit of pump 1. Hydraulic motors 501, 601 are coupled to wheels 500, 600 and each comprise two principal connections 503, 504 and 603, 604, respectively. Conduits 507, 607 connect the principal connections 503, 603 to conduit 5; conduits 508, 608 connect the principal connections 504, 604 to conduit 8. Restrictions 509, 609, of adjustable values, similar to restrictions 109, 209, 309, 409 and connected in similar manner to a processing device similar to device 11, are placed, some, 509, on conduits 508, which in the present case constitute the exhaust conduits of motors 501, the others, 609, on conduits 607, which here constitute the supply conduits of motors 601. The constituents of the diagram of FIGS. 1 and 2 are found again here, including the speed measuring devices associated with each wheel, and the devices for adjusting the values of the various restrictions, the connections being similar.

In the diagram of FIG. 3, a restriction 509 is therefore disposed on the exhaust conduit of motor 501 of each front wheel 500, and is adapted to produce a counter-pressure opposing the exhaust of the fluid from said motor 501.

The vehicle may also take the configuration in which it descends the slope in reverse, the rear wheels 600 in that case being placed at a level lower than that of the front wheels 500. In this configuration, the delivery conduit of pump 1 is constituted by conduit 8. Conduits 508, 608 constitute the supply conduits of the hydraulic motors 501, 601 and the restriction 609 is therefore placed on the exhaust conduit 607 of the motor 601. A configuration similar to that described first and effectively shown in FIG. 3 is found again.

In this way, when the vehicle descends the slope, whether forwardly or in reverse, restrictions 509 or 609 are each time placed on the exhaust conduits of one of the groups of motors 501 or 601 respectively.

Before describing the functionings obtained of the vehicles described hereinabove, the following remarks should now be made:

the processing device 11 is generally constituted by a calculating machine associated with electronic circuits, adapted in particular to make the choice of a reference speed possibly different from the smallest V400 of the speeds; the reference speed chosen may for example be constituted by the average of several other speeds measured; similarly, the range V12 may have any desired value;

the pumps 1 shown are pumps with variable cubic capacities; this particular arrangement is, however, not compulsory, the diagrams functioning equally well with constant c.c. pumps;

the motors 101, 201, 301, 401, 501, 601 shown are motors with constant cubic capacities, with one sole cubic capacity; hydrostatic transmissions are more and more frequently using motors with several cubic capacities, each constant, and the invention is naturally applied to the vehicles using such motors;

the diagrams described exclusively show so-called "drive" wheels, each coupled to a hydraulic drive motor; certain vehicles may also present non-drive wheels, which may themselves be associated with speed measuring devices connected to the processing device 11 and the invention may naturally be applied to such vehicles;

it is even often opportune, in a system whose aim is to eliminate skidding of the drive wheels, to select the reference speed either from the speeds of non-drive wheels, or taking into account the speeds of non-drive wheels;

finally, although the embodiments described refer to vehicles equipped with wheels, the invention may also be applied to vehicles comprising endless metal belts of the Caterpillar type, even if the risk of skidding is greater with wheeled vehicles; one should therefore speak generally of vehicles equipped with displacement members.

The vehicle of FIGS. 1 and 2 firstly functions in conventional manner, as if restrictions 109, 209, 309, 409 had not been provided. It is therefore admitted that, initially, these restrictions are entirely open and form no obstacle to the flows of fluid. Motors 101, 201, 301, 401 are supplied in parallel by the fluid delivered by pump 1, all at the same pressure and all rotate at the same speed. The end 115, 215, 315, 415 of segments V100, V200, V300, V400 are al contained in or on the edge of range 12, with the result that no non-zero signal arrives at the various output connections 106, 206, 306, 406 of the processing device 11 and, consequently, no order for adjustment of the values of the restrictions 109, 209, 309, 409 arrives at the adjusting members 110, 210, 310, 410 said restrictions remaining entirely open.

When one (or more) of the wheels, such a wheel 100, begins to skid since the driving torque of the corresponding motor 101 which is coupled thereto is excessive taking into account the adherence of said wheel on the ground, the speed of this wheel increases with respect to those of the wheels which are not skidding, and the magnitude V100 exceeds range 12. The processing device 11 generates a correction signal, function of the calculation program that it possesses, which correction signal, conveyed up to the device 110 for adjusting the value of the restriction 109, controls modification of the value of this restriction which, in the present case, reduces supply in that part of the supply conduit 107 connected to connection 103 of the hydraulic motor 101 until the torque of said hydraulic motor becomes equal to the value for which skidding of wheel 100 is eliminated.

The effect of reduction of the torque of the motor coupled to the wheel beginning to skid is the same when the restriction is placed on the exhaust conduit instead of being placed on the supply conduit of said hydraulic motor. Moreover, it should be noted that, depending on the directions of delivery of pump 1, the conduits 108, 208, 308, 408 constitute, depending on the case, the exhaust conduits or the supply conduits of said hydraulic motors, at least when the vehicle moves over substantially horizontal ground.

When the vehicle moves over sloping ground, as shown in FIG. 3, the force of gravity tends to pull the vehicle downwardly, so that it often appears judicious to place a restriction on the exhaust conduit of at least one of the hydraulic motors, in order to brake the corresponding wheel, and consequently the vehicle itself.

By placing the restrictions 509, 609 such as shown in FIG. 3, whatever the position of the vehicle on ground 13, whether the vehicle is descending forwardly or in reverse, in each case, the exhaust conduits of certain of the hydraulic motors are provided with a restriction: they are conduits 508 and restrictions 509, when the vehicle is descending forwardly (configuration shown); they are conduits 607 and restrictions 609 when the vehicle is descending in reverse (configuration described but not shown).

Furthermore, referring to the configuration shown in FIG. 3, it may be observed that, if the rear wheel 600 tends to skid during descent of the vehicle, there would be the risk of a change in its direction of rotation: the hydraulic motor 601, instead of continuing to be supplied with pressurized fluid via its principal connection 603, risks being supplied via its principal connection 604. The presence of restriction 609 on conduit 607, restriction 509 already being provided on conduit 508, suffices to obtain satisfactory functioning.

The invention is not limited to the embodiments described, but covers, on the contrary, all the variants which may be made without departing from the scope nor spirit thereof.

What is claimed is:

1. A vehicle equipped with a plurality of displacement members, at least certain of which being coupled to a fluid motor and comprising a pressurized fluid supply circuit comprising, in addition to said motors:
   - a source of pressurized fluid connected to a fluid delivery conduit;
   - at least two fluid supply conduits each connected, in parallel, to said fluid delivery conduit; and to a particular one of said fluid motors, the latter each comprising a fluid exhaust conduit;
   - devices for measuring the speed of at least those of the displacement members coupled to said particular motors;
   - restrictions of adjustable values which are disposed on at least one of the fluid supply and fluid exhaust conduits of said particular motors, one on at least one of each fluid supply and fluid exhaust conduit, and are provided with individual devices for adjusting their values;
   - a reference speed of displacement members is selected;
   - a processing device, incorporated in the vehicle, which compares each measured speed of said displacement members coupled to the particular motors, with said reference speed and which generates, for each particular motor, a correction signal, the processing device comprising as many output connections, where the correction signals are available, as there are restrictions, each correction signal corresponding to the measured speed of a displacement member coupled to one of said particular motors;
   - while each outlet connection is connected to the device for adjusting the value of the restriction placed on either the fluid supply conduit or on the fluid exhaust conduit of the particular motor corresponding to the correction signal generated by the processing device from the measured speed of the displacement member coupled to said particular motor, wherein it comprises front and rear displacement members, each coupled to one of said particular motors, each particular motor being of a reversible type, while a restriction of adjustable value is placed on the supply conduit of each particular motor coupled to the rear displacement members, another restriction of adjustable value likewise being placed on the exhaust conduit of each motor coupled to the front displacement members.

2. The vehicle of claim 1, wherein said reference speed is equal to the lowest of the measured speeds of the displacement members of the vehicle.

* * * * *